Aug. 18, 1970   J. EGGERT ET AL   3,524,700
TELEPHOTO LENS
Filed May 15, 1969   3 Sheets-Sheet 1
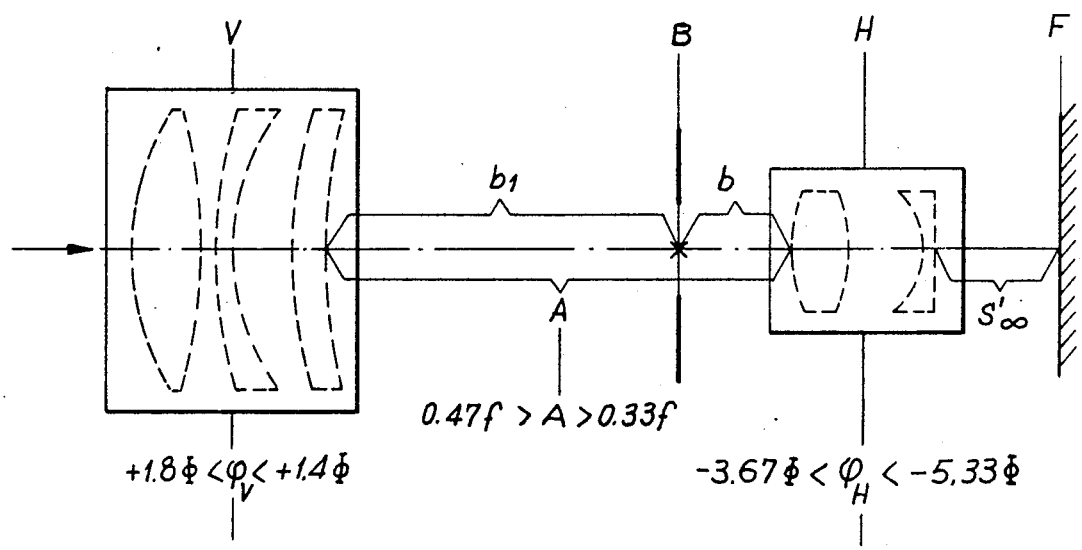
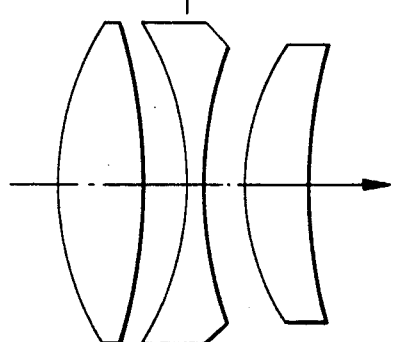
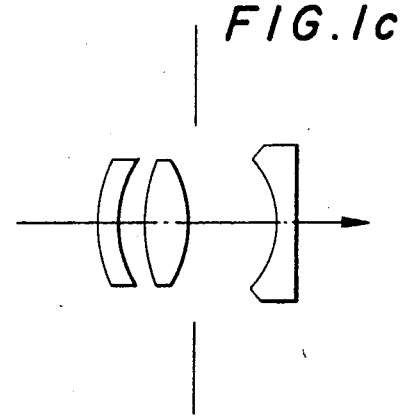
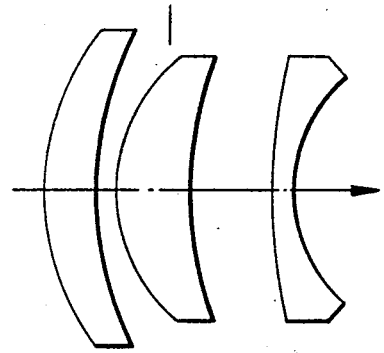
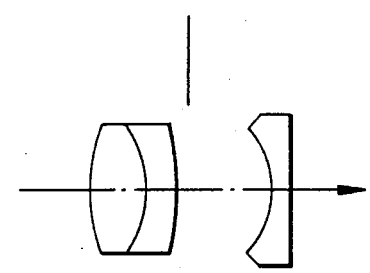

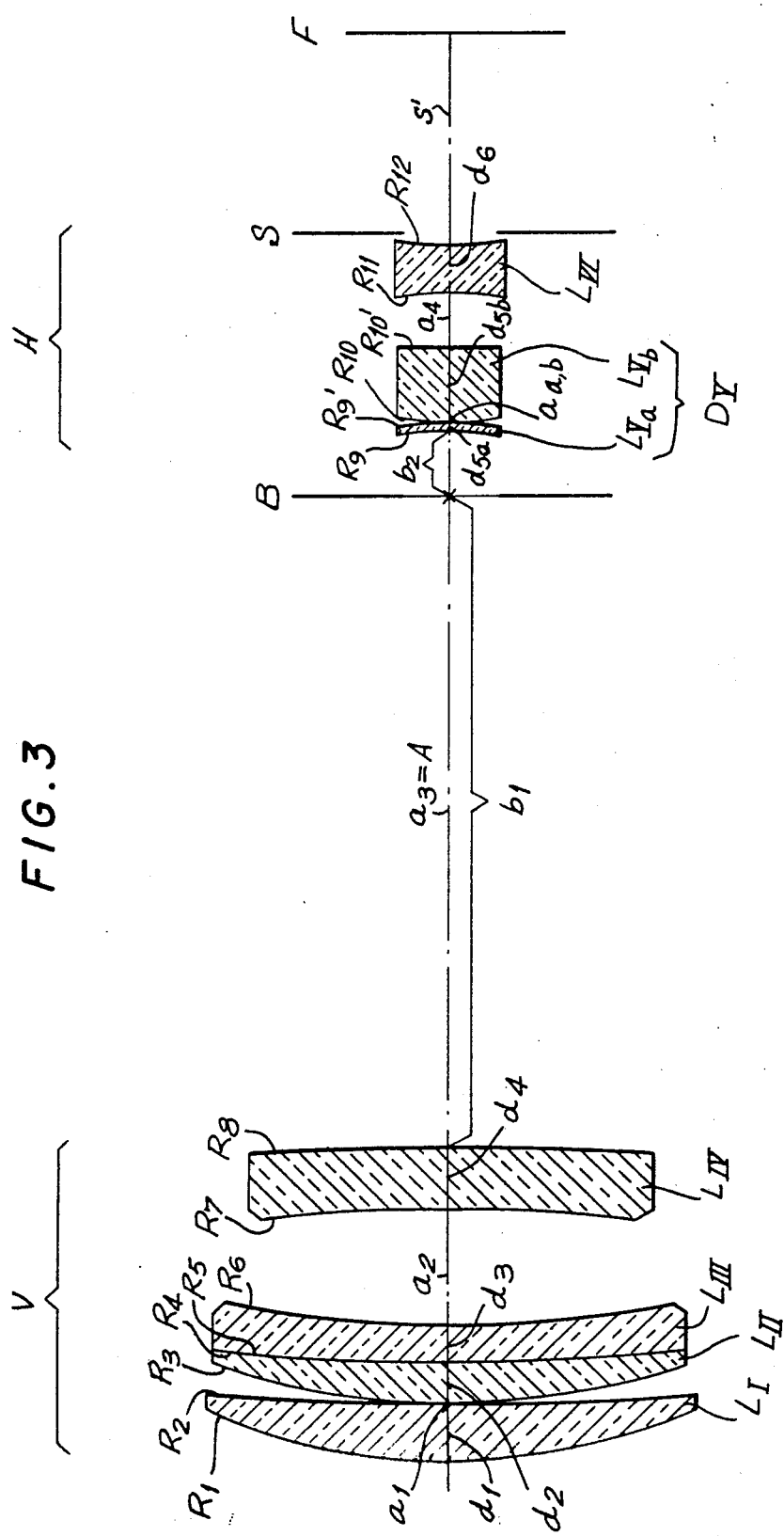

United States Patent Office 3,524,700
Patented Aug. 18, 1970

---

3,524,700
TELEPHOTO LENS
Joachim Eggert, Ernst Tronnier, and Fritz Uberhagen, Braunschweig, Germany, assignor to Voigtlander A.G.
Continuation-in-part of application Ser. No. 443,861, Mar. 30, 1965. This application May 15, 1969, Ser. No. 824,802
Claims priority, application Germany, June 20, 1964, V 26,214
Int. Cl. G02b 9/10, 9/62
U.S. Cl. 350—215                                 5 Claims

ABSTRACT OF THE DISCLOSURE

A telephoto objective for cameras. The objective has a telephoto effect of between 7 and 14 and includes a front positive component and a rear negative component separated from each other by a predetermined air space along the principal axis. The size of this air space along the principal axis is smaller than 0.47 times but greater than 0.33 times the focal length of the entire objective. The quotient resulting from dividing of the size of this air space along the principal axis by the back focal length is between 3.33 and 4.33. The product obtained by multiplying the size of this predetermined air space along the principal axis divided by the focal length of the entire objective and the back focal length divided by the local length of the entire objective is between 0.052 and 0.037. With these features it is possible to achieve a telephoto objective of relatively short total length which will have an extremely good imaging capability.

CROSS REFERENCE TO RELATED APPLICATION

This application is a continuation-in-part of co-pending application Ser. No. 443,861, filed Mar. 30, 1965 now abandoned, and entitled Telephoto Lens.

BACKGROUND OF THE INVENTION

The present invention relates to photographic objectives.

In particular, the present invention relates to telephoto objectives, and especially those which have a relative aperture of between 1:8 up to approximately 1:4 and which with this range of relative apertures has an average illuminance.

The present invention relates in particular to a telephoto objective of this latter type which has a very great telephoto effect. The telephoto effect is the quotient which is derived from dividing the equivalent focal length of the objective by the back focal length thereof, and the present invention relates to objectives which will have a telephoto effect of between 7 and 14.

Objectives of the above type are particularly suitable for cameras which require objectives of long focal length with the objective mounted at the front side of the camera in front of a between-the-lens type of shutter which is situated in this case directly by the camera body or by an intermediate tube which is attached to the camera body and which is adapted to accept interchangeable objectives of different focal lengths, whereas when the shutter is directly carried by the front wall of the camera, this front wall is also capable of interchangeably receiving different objectives which will be attached thereafter to the front wall. Thus, the term "between-the-lens" shutter is used here to distinguish from a focal plane shutter, since in the particular construction referred to the shutter does not form part of the objective assembly and is carried by the camera body itself directly behind the objective, but nevertheless the shutter behaves in the same way as a between-the-lens shutter and for classification purposes is referred to as a between-the-lens shutter, particularly in order to distinguish it from a focal plane shutter.

With a camera of this type the passage of light to the image plane, for producing an image, is limited to a great extent by the size of the opening which is provided by a shutter of this type, as well as by the position of the shutter with respect to the focal plane. The size of the opening which is provided by the shutter of such a camera will, of course, determine the largest possible cross section of the bundle of light which can pass through to the image plane, so that this opening limits the useful diameter of the rear element of the objective. The position of the shutter with respect to the image plane will determine the inclination of the light rays of the lateral cones of light to provide extra-axial imaging, and thus the size of the photographically useful viewing field will be appropriately influenced by any position of the shutter with respect to the focal plane.

In modern compact cameras, the distance between the shutter and the image plane, referring of course to a shutter of the type discussed above, must, in the interest of reducing the bulk of the camera to a minimum, be very small. Therefore, interchangeable objectives of extremely short back focal lengths are required. For objectives of long focal length, this compact structure of the camera results in very great telephoto effects, which, as was pointed out above, is numerically the quotient resulting from the dividing of the equivalent focal length by the back focal length. The expression "back focal length" as referred to herein signifies the distance between the vertex of the rearmost lens of the objective and the image plane. Therefore, it follows that the telephoto effect will increase not only with an increase in the focal length of the entire objective but also with a decrease in the back focal length, so that the more compact the camera is the smaller will be the back focal length and thus the greater the telephoto effect.

Of course, there have been many attempts to provide objectives of long focal length with a very great telephoto effect. For example, U.S. Pat. 3,106,598 disclosed an objective which has a telephoto effect of approximately 30. However, the telephoto system disclosed in this patent is not a pure, classical telephoto construction inasmuch as the rear component of this system is not a negative component, but instead is a triplet, followed by a Smith type field-flattening lens having a converging refractive power. Inasmuch as this latter proposal in addition requires the objective to have a total length which is more than 160% F (focal length), the principal points of the objective are situated, in contrast to their location in the pure, classical type of telephoto objective, not in front of the objective on the side of the longer conjugate, but rather in the interior of the system between the front component thereof and the diaphragm in the air space which is situated between the diaphragm and the front component. Moreover, in this known construction the length of the entire unit and the total distance from the front vertex up to the image plane is much greater than encountered with classical telephoto objectives, so that this construction is unwieldly.

In addition, there are some known telephoto objectives of pure, classical construction which have a telephoto effect between 3 and 6. With these structures it is indeed possible to achieve telephoto effects of this latter range without resorting to measures such as extreme distribution on the refractive powers or extreme lens configurations, or even through sacrifice of image quality. However, a further increase of the telephoto effect beyond 6 could only be achieved up to the present time for viewing angles whose useful areas were extremely small, on the order of between approximately 2° and 4°, if there is to be available within the viewing field an image of sufficient sharpness.

The extremely great inner air space between the front component of the telephoto objective and the rear negative component thereof makes the limitation to an extremely small viewing field essential, not only for the purposes of image sharpness but also for the purpose of providing sufficient illuminance, since a telephoto objective with a very great inner air space between its front and rear components, has the tendency to produce very pronounced vignetting. This latter problem makes the technical use of a relatively large viewing field practically impossible.

SUMMARY OF THE INVENTION

It is accordingly a primary object of the present invention to provide a telephoto objective which will avoid all of the drawbacks of the prior art.

In particular, it is an object of the present invention to provide a telephoto objective which will avoid the danger of vignetting.

Thus, the objects of the present invention include a provision of a telephoto objective which will have between its front and rear components a relatively small air space which will have a size along the principal axis of less than 47% of the equivalent focal length of the entire objective without, however, being less than 33% of this equivalent focal length.

In addition, it is of course an object of the invention to provide a telephoto objective which can accomplish the above objects while at the same time having a telephoto effect of between 7 and 14.

The objects of the present invention also include the provision of a telephoto objective which will reliably compress the bundle of light passing through the objective so that the cross section of this bundle of light will be smaller than and will be able to pass without interference through the opening provided by the shutter, as described above.

Furthermore, it is an object of the present invention to provide a telephoto objective of relatively short total length and which will have an extremely good imaging capability while at the same time providing the user with a useful, effective viewing field of the order of 7°.

It is also an object of the present invention to provide a telephoto objective whose lenses do not require any particularly pronounced curvature, so that it is a simple matter to accurately and conveniently manufacture the telephoto objective of the invention.

The objects of the present invention also includes the provision of a telephoto objective which will reliably avoid any significant amount of aberrations of higher orders.

In order to achieve the above objects, the telephoto objective to the invention has a relatively great telephoto effect on the order of between 7 and 14, as pointed out above. The back focal length of the objective of the invention, when the objective is set forth objects at a relatively great distance from the objective, is, as a result, smaller than $1/7$ of the equivalent focal length of the entire objective, and it can be reduced to a $1/14$ of the equivalent focal length. Thus, the telephoto objective oft he invention includes a front component, at the longer conjugate side, having a converging refractive power and the telephoto objective includes to the rear of its front component in the direction of the shorter conjugate a diverging rear component which is situated at a finite distance from the front component to provide a space which can accommodate the diaphragm, and the front component, of course forms what is conventionally referred to as the positive component of the telephoto objective while the rear component of the telephoto objective. The telephoto objective of the invention is of the classical, pure type, in that not only is the rear component of the telephoto objective of a negative refractive power, but in addition the principal points of the entire objective are situated on the side of the longer conjugate in front of the front component of the objective. Therefore, the total length of the objective from the front vertex of the front lens thereof to the focal plane is considerably smaller than the focal length.

As was pointed out above, the telephoto objective of the present invention will avoid vignetting while maintaining a relatively small air space between the front and rear components, and this air space will have a longer principal axis, a length of less than 47% but not less than 33% of the equivalent focal length of the entire objective, and at the same time the telephoto objective will be able to provide telephoto effects of between 7 and 14. Therefore, the objective of the invention will have a relatively large range of possible uses while simultaneously avoiding vignetting.

The telephoto objective of the invention thus differs basically from conventional structures where in order to provide large telephoto effects the positive front component and negative rear component were separated from each other by particularly large air spaces which in earlier proposals had a length of more than one half and up to 90% of the focal length of the objective, as shown, for example, in German Pat. (DAS) 1,085,347. Where such an extremely large air space is provided within the system, it is of course necessary to add to this distance required by the air space the distance required by the thickness of the rear component and the distance required by the back focal length all the way up to the focal plane, so that with such constructions it is hardly possible to achieve any sort of appreciable shortening of the entire length of the assembly. In the limiting case where the extent of the air space between the front and rear components is on the order of 0.9F (focal length), in order to achieve a telephoto effect of 8⅓, the axial distances for the rear component and the back focal length require a total of between 14% and 16% of the equivalent focal length of the objective, so that for an air space on the order of 0.9F the rearmost vertex of the rear lens of the front component must be situated from the image plane by a distance which is greater than the equivalent focal length of the entire objective, so that the principal points of such an objective must of necessity be situated within the assembly of lenses and cannot be situated on the object side of the objective in front of the entire objective. This extremely important interrelationship between the telephoto effect of a telephoto objective and its back focal length as well as the free air space between its front and rear components, can be numerically demonstrated, as will be seen from the description which follows.

The back focal length ($s'$) is taken with reference to an object at infinity and is therefore referred to in the literature also as $s'_\infty$. The back focal length is always the distance from the rear vertex of the rearmost lens up to the image plane, irrespective of any additional elements located in this space between the rearmost lens and the image plane, such as filters, prisms or other light-directing elements, beam splitters, or the like.

As was indicated above, it is possible with the telephoto objective of the invention to avoid sharply curved lenses so that the manufacturing of the telephoto objective of the invention can be conveniently and inexpensively carried out at a high degree of accuracy. Thus, the objective of the present invention is in sharp contrast to several older proposals such as those shown in German Pat. (DPB) 861,161 (see $r_6$, $r_7$ and $r_8$), as well as British Pat. 685,659 (see $r_8$, $r_9$), and also in German Pat. (DBP) 1,109,396, where reference may be had to $r_{10}$ and $r_{11}$, etc. With the objective of the invention even when the telephoto effect is approximately doubled, the steepest curvature of the lens surfaces is reliably maintained at values which are larger than ¾ of the entrance opening (full diameter) of the entrance pupil, and therefore the maximal possible opening for the passage of the bundle of light rays with the objective of the invention makes it possible to eliminate the undesirable occurrences of aberrations of higher orders to a very large extent, such aberrations often being encountered in telephoto objectives of known construction and presenting serious problems in the know constructios.

BRIEF DESCRIPTION OF THE DRAWINGS

Some examples of telephoto objectives constructed in accordance with the present invention are illustrated in the drawings which form part of this application and in which:

FIG. 1 illustrates one embodiment of a telephoto objective of the invention, FIG. 1 showing the possible ranges of various factors;

FIG. 1a illustrates another embodiment of a front component of the objective of FIG. 1;

FIG. 1b illustrates a further embodiment of a front component of the objective of FIG. 1;

FIG. 1c shows another possible embodiment of a rear component of the objective of FIG. 1;

FIG. 1d illustrates yet another embodiment of a rear component of the telephoto objective of FIG. 1;

FIG. 3 shows yet another embodiment of a telephoto objective according to the present invention.

DESCRIPTION OF PREFERRED EMBODIMENTS

Figure 2:
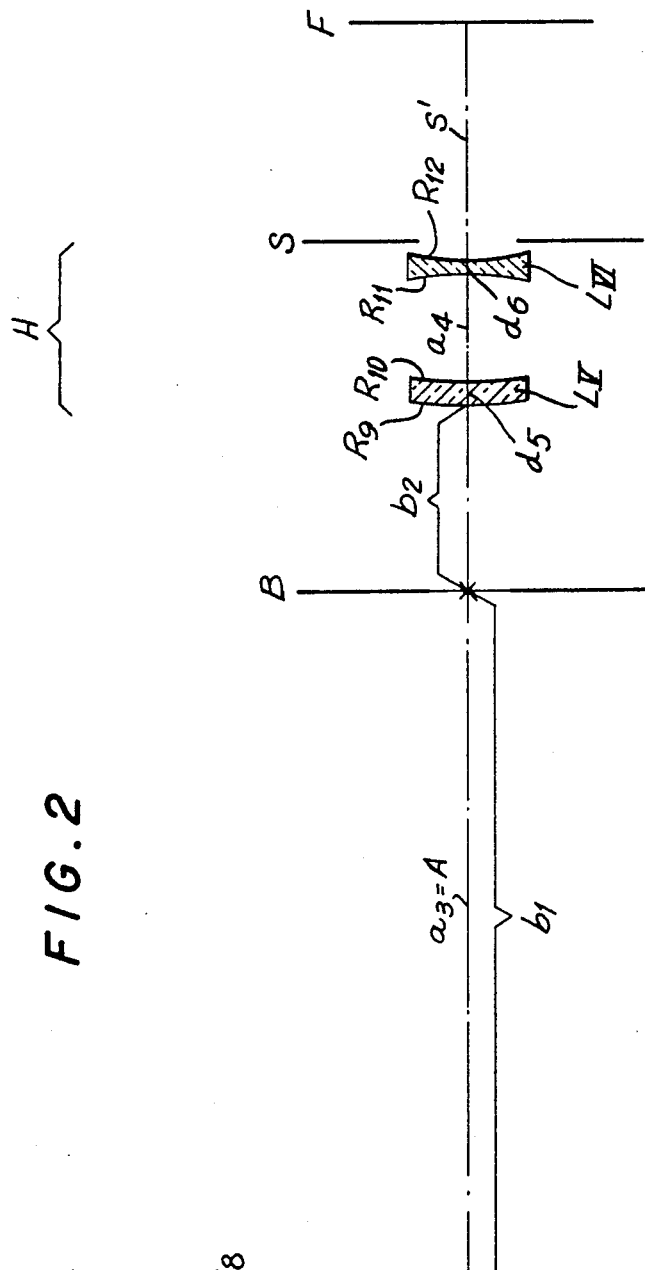
FIG. 2 shows a further embodiment of a telephoto objective according to the invention.

The telephoto objective shown in FIG. 1 includes a front component V and a rear component H, the tubular structure which normally supports these components and which also carries the diaphragm mechanism being omitted for the sake of more clearly illustrating the invention in a schematic manner, although FIG. 1 does show the tubular structures carry the elements which form the front component V and the rear component H. These elements are shown in dotted lines within their schematically illustrated housings. FIG. 1 shows the distance A along the principal axis between the rear vertex of the rear lens of the front component V and the front vertex of the front lens of the rear component H, and in addition FIG. 1 shows the back of focal length $s'_\infty$.

As indicated beneath the front component V in FIG. 1, the refractive power of the front component is greater tha n+1.0 but less than +1.4 times the total refractive power of the entire objective, while, as is indicated beneath, the rear component H, the refractive power of the rear component is greater than −3.67 but less than −5.33 times the total refractive power of the entire objective.

Furthermore, it will be seen that the distance A is inidcated as being greater than 0.33 but less than 0.47 of the focal length of the entire objective, as has already been indicated above, and the back focal length $s'_\infty$ is indicated as extending between the rear vertex of the rear lens of the rear component H and the focal plane F. Furthermore, it will be noted that FIG. 1 indicates diagrammatically the diaphragm B situated in the air space between the front and rear components, this diaphragm B being located along the principal axis at a distance $b_1$ to the rear of the rear vertex of the rear lens of the front component V, and at a distance small $b_2$ from the front vertex of the front lens of the rear component H, the distance A of course being equal to the total of the distances $b_1$ and $b_2$.

FIGS. 1a and 1b, respectively, illustrate two further possible combinations of three lenses to form the front, positive component of a telephoto objective of the invention, while FIGS. 1c and 1 illustrate two further possible combinations of lenses to form the rear, negative component of the telephoto objective of the invention. The lenses which make up the front component of the telephoto objective of the invention, in order to have sufficient possibility of fine corrections, include at least three elements spaced from each other by air spaces, and guaranteeing that a very great capability of providing high quality images is achieved by maintaining intermediate aberrations and image-error influences of high order relatively small. Thus, it will be seen that in FIG. 1 the front component V includes an intermediate lens situated between the illustrated front and rear lenses and having a hollow concave surface which is strongly overcorrecting for spherical and chromatic aberrations and which is directed toward the rear lens element of the front component V. It will be noted that in FIG. 1a, this concave lens surface of sharpest curvature is situated at the front face of the intermediate lens and is thus directed forwardly toward the side of the longer conjugate. In FIG. 1b, however, this negative lens which operates with overcorrection is situated at the rear of the front component V and has its hollow concave surface directed rearwardly toward the inner finite space A.

While in FIG. 1 the rear component H includes two lenses with a hollow concave surface providing the characteristic diverging surface of its negative lens element and directed toward the diaphragm B, as is indicated by the heavier dotted line of the front surface of the rear lens of the rear component H, it will be seen that in FIG. 1c the rear component H includes three lenses separated from each other by finite interior air spaces while in FIG. 1d the assembly of the type shown in FIG. 1c forms a two-element assembly by cementing together of the front and intermediate elements.

FIGS. 2 and 3 show further embodiments, respectively, of telephoto objectives of the invention, and in these embodiments, in order to achieve an increased capability of providing high quality images, the front components V, constructed in accordance with the structure schematically illustrated in FIG. 1b, include a converging front lens and a diverging rear lines directed toward the relatively large air space A, and these front components of FIGS. 2 and 3 includes between their front and rear lenses a doublet. In contrast to FIG. 1b, the rear diverging lens of the front components V of the embodiments of FIGS. 2 and 3, has its concave surface of smallest radius directed toward the longer conjugate, as indicated for the diverging intermediate lens of the front component of FIG. 1a. The telephoto objective of FIG. 2 is provided with two-lens rear component H indicated schematically in FIG. 1. The several radii of the lens surfaces as well as the thicknesses thereof and the distances therebetween, are all referred to in the examples which follow as well as in the list of the various required relationships which are indicated below.

In FIG. 3, the rear component H includes a front lens unit which itself has a pair of elements, so that the capabilities of the telephoto objective of the invention can be increased with the structure of FIG. 3, and in contrast to the rear component illustrated in FIG. 1c. the front meniscus lens of the rear component has its concave surface directed forwardly toward the side of the longer conjugate.

In all of the figures the image plane is indicated at F (film plane), and the diaphragm is indicated at B, and in the interest of providing a particularly uniform illuminance, the diaphragm is situated so close to the rear component H that its distance $b_2$ along the principal axis forwardly of the front vertex of the negative component H is between 1% and 10% of the equivalent focal length of the objective.

The telephoto objective of the invention, in order to achieve the results discussed above, will fulfill, in combination, the following five requirements:

(a) $\qquad 1.0\Phi < \varphi_V < 1.40\Phi$

Thus, as has already been indicated above in connection with FIG. 1, the total of the refractive powers of the surfaces of the lenses of the front component V($\varphi_V$) is greater than 1.0 but less than 1.4 times the refractive power of the entire objective.

(b) $\quad 3.67\Phi < |\varphi_H| < 5.33\Phi$

As has already been indicated above in connection FIG. 1, the rear, negative component H has negative total refractive power of its surfaces ($\varphi_H$) which has an absolute value of between 3.67 and 5.33 times the equivalent refractive power $\Phi$ of the entire objective.

(c) $\quad 0.47F > A > 0.33F$

As was always indicated in FIG. 1, the distance A is less than 0.47 but greater than 0.33 of the focal length of the objective.

(d) $\quad 3.33 < (A:s'_\infty) < 4.33$

In other words, the quotient of the distance A divided by the back focal length, for an object at infinity, is between the values 3.33 and 4.33.

(e) $\quad 0.052 > \dfrac{A \cdot s_\infty'}{F^2} > 0.037$

Thus, it will be seen that a further requirement fulfilled by the structure of the invention is that the product of the distance A divided by the focal length of the entire objective and the back focal length divided by the focal length of the objective is less than 0.052 but greater than 0.037.

With the combination of the above five primary requirements it is possible to achieve the important results of the present invention, although the telephoto objective of the invention is improved by additional subsidiary requirements which are referred to below.

By fulfilling the above five requirements, the telephoto objective of the invention will provide a telephoto effect of between 7 and 14 while at the same time including a relatively small air space between the front, positive component and rear, negative component of the telephoto objective while also avoiding the undesirable vignetting, as is encountered with telephoto objectives of relatively large interior air spaces between front and rear components. Furthermore, by fulfilling these requirements, it is possible to avoid over-dimensioning of the diameters of the lenses of the front, positive component as would otherwise be required to reduce the vignetting which must be taken into account with telephoto systems of such high telephoto effects as soon as the useful viewing field becomes greater than 3° to 4°, and where the diaphragm is arranged in the region of the negative, rear telephoto component.

I will be noted that the above requirements (d) and (e) determined the relationship between the back focal length and the air space A. This factor cannot be illustrated in a simple manner, as by a single numerical value, for example. The same is true if instead of using the back focal length $s'$, the telephoto effect T is used for the requirements (d) and (e). The unit-less number T is, of course, the reciprocal of the quotient of the back focal length divided by the focal length of the entire objective, so that the relationsips in requirement (d) when given in terms of the telephoto effect would be indicated as $A.T$ and in an analogous manner the relationships of requirment (e) can be given in terms of the telephoto effect by using $A:T$. If the distance A and back focal length are determined numerically in accordance with the above relationships set forth in requirements (d) and (e), then these magnitudes will be converted to their proper relationships with respect to a focal length of 1, in order to avoid the necessity of subsequently dividing by the square of the focal length, for the case where the equivalent focal length is not 1.

It is apparent from the above relationships of the invention, that the invention avoids very sharply the possibility of providing a very great telephoto effect by using a front positive component of very short focal length and thus a very great converging refractive power, as is already known from a prior formula for the back focal length for a doublet having a finite inner space, and instead in accordance with the invention, the front positive component has only a relatively small individual refractive power, so that it is possible in particular to avoid the occurrence of significant aberrations of higher orders at the front end of the objective of the invention.

Furthermore, it is apparent from the above relationships of the invention that the objective of the present invention, in contrast to many old proposals, provides for the rear component H a considerable negative refractive power. Thus, the present invention distinguishes sharply from the structure of an old telephoto objective as shown in the above U.S. Pat. 3,106,598, where the rear element has a positive refractive power. Also, the invention is in sharp contrast with the proposal according to which the rear component is without any refractive power so as to fulfill the requirement $\varphi_H = 0$, as disclosed in the German Pat. (DBP) 1,018,236 and 1,096,057 (Leitz). The invention is also in sharp contrast with the proposal of the Schneider German Pat. (DRP) 432,236, where the rear component is provided with a refractive power which is equal but opposite to that of the front component and thus fulfills the requirement $\varphi_H = -\varphi_V$. As is apparent from the relationships (a) and (b) indicated above, the absolute value of the refractive power of the rear, negative component of the telephoto objective of the present invention is considerably greater than the refractive power of the front, positive component thereof. These latter features serve to situate the exit pupil—since the image provided by the negative component is that of the diaphragm of the objection—in the immediate vicinity of the rear, negative component, and thus it becomes possible to situate the passage of the light in the shutter of the camera. Thus, the structure of the present invention is sharply different from known telephoto objectives where the front lens assembly at the entrance to the objective determines the location of the entrance pupil and thus the location of the diaphragm in the immediate vicinity of the front lens unit. Such objectives cannot solve the problems which are solved by the objective of the present invention, inasmuch as these known objectives cannot be used for the same extent of useful viewing field with a compact camera of the type which supports the telephoto objective of the present invention, because such known telephoto objectives have an extremely great drop in the intensity of the light so as to prevent their being used for photographic purposes. As a result of the above-discussed situation of the pupils of the objective of the invention, a falling of the light intensity of this latter type is eliminated, particularly as the result of the combination of the above requirements.

Inasmuch as the objective of the present invention, because of its particularly small inclination to vignetting, it is intended to be used with a relatively large viewing angle, it is possible by adhering to the subsidiary relationships referred to below to provide for the objective of the invention a viewing angle of more than 50° while achieving sharp images.

Referring particularly to FIGS. 2 and 3, it will be seen that for these additional purposes, the telephoto objective of the invention has a front component V which is made up of a front converging lens $L_I$ and a rear diverging lens $L_{IV}$, as well as, between these lenses and separated from them by air spaces, a unit composed of lenses $L_{II}$ and $L_{III}$. This latter unit is preferably in the form of a doublet. In view of the relatively large penetration at the surfaces of the lenses of the front component V of the light which determines the imaging of the lateral portions of the viewing field, the invention includes a very favorable balancing of the astigmatic error, on the one hand, and correction for spherical aberration of the central region of the image, on the other hand, by maintaining the air space $a_2$ between the inner doublet $L_{II}$, $L_{III}$ and the rear lens $L_{IV}$ at a length along the principal axis of between 0.04F and 0.07F, where F is the focal length of the entire objective, and in addition it will be noted that the curvature of the rear surface of the lens $L_{III}$ and the front surface of the lens $L_{IV}$ provides this air space which has the dimension $a_2$ along the principal axis with the configuration of a positive lens. Thus, this relationship provides the next requirement of the invention, namely:

(f) $\qquad 0.04F < a_2 < 0.07F$

Furthermore, the diverging action of the refractive power of the air space $a_2$ is to be made so great that its absolute value is greater than 5/3 but less than 7/3 times the refractive power of the entire objective.

Thus, this relationship provides the next requirement of the present invention, namely:

(g) $\qquad 5/3\Phi < |\varphi a_2| < 7/3\Phi$

According to the further feature of the present invention, the absolute value of the refractive power of the negative lens $L_{IV}$ at the rear of the front component V is preferably between 0.4 and 0.5 times the total refractive power of the telephoto objective of the invention.

This relationship, therefore, provides the next requirement of the invention, namely:

(h) $\qquad 0.4\Phi < |\varphi L_{IV}| < 0.5\Phi$

In order to approach the best possible imaging capability of the objective of the invention, the lens $L_{IV}$ is preferably curved in such a way that its surface of smaller radius of curvature is directed toward the objective, which is to say toward the front, and is a concave surface having a Gardner's shape factor $\sigma$ which is positive and if possible at a value of between +1.25 and +4.25.

Thus, this relationship is the next requirement of the invention, namely:

(i) $\qquad 1.25 < \sigma L_{IV} < 4.25$

As a result of the above construction of the negative lens $L_{IV}$ it is possible at the same time to very favorably influence distortions which are often difficult to reduce in telephoto objectives.

Gardner's shape factor, referred to above, is defined in I. C. Gardner, "Application of Algebraic Aberration Equations to Optical Design," at pages 82 and 83.

Referring to FIG. 2, the lens $L_V$ which forms the front lens of the rear component H and which is situated behind the diaphragm B at the distance $b_2$ therefrom can take the form of a positive element having a refractive power of between 0.9 and 1.6 times the refractive power of the entire system, so as to provide the next subsidiary requirement of the invention, namely:

(j) $\qquad 0.9\Phi < \varphi L_V < 1.6\Phi$

The rear lens $L_{VI}$ of the rear component H of FIG. 2 is situated directly in front of the shutter, as shown schematically in FIG. 2, and is a negative lens having an absolute refractive power of between 5 and 6.5 times the total refractive power of the objective, thus providing the next requirement, namely:

(k) $\qquad 5\Phi < |\varphi L_{VI}| < 6.5\Phi$

The space $a_4$ which is included between the lenses of the rear component H in FIG. 2, has the form of a converging lens where the total refractive power of its limiting surfaces, which is to say the refractive power of the air lens defined between the lenses of the rear component H of FIG. 2 has a negative value of between 3.75 and 5.75 times the refractive power of the entire objective, thus providing the next relationship of the invention, namely:

(l) $\qquad -5.75\Phi > \varphi a_4 > -3.75\Phi$

This distance of $a_4$ between the lenses of the rear component H preferably has a size along the principal axis which is between 2.7% and 5.5% of the focal length of the objective, thus providing the next relationship of the invention, namely:

(m) $\qquad 0.027F < a_4 < 0.055F$

Of course, the above relationships apply also the embodiments of FIGS. 1 and 3.

Further the features of the structure of the invention make it possible to provide an image of extremely high quality while using the relatively large useful viewing angle provided by the objective of the invention. Of course, high quality images are extremely important, particularly where the telephoto objective with its relatively great telephoto effect is to be used with objectives of long focal length, which, as is known, will only provide images of a high degree of sharpness if the longitudinal residual aberration for such extremely long focal lengths can simultaneously be maintained at particularly small numerical values.

It is possible to improve the imaging capability of the structure, preferably by correcting for coma and extending the astigmatic image surfaces, by providing a construction as shown in FIG. 3 where the front converging element of the rear, negative component H is in the form of a lens unit of doublet construction $D_V$ having a front diverging meniscus lens $L_{Va}$ provided with a front concave surface and followed by a converging lens $L_{Vb}$. The space included between these latter lenses of the front lens of the rear component H forms a biconcave negative air lens having a converging refractive power ($\varphi_{a_a,b}$) which preferably is between 5.0 and 6.5 times the total refractive power of the objective.

This latter relationship therefore provides the next requirement of the invention, namely:

(n) $\qquad 5\Phi < \varphi_{a_a,b} < 6.5\Phi$

EXAMPLE 1

The following is a specific numerical example of the telephoto objective of the invention shown in FIG. 2, for a focal length of 100, a relative aperture of 1:5.6 and a back focal length $s \infty$ which is 11.235. In the following table the various symbols refer to those which are used in FIG. 2, with respect to the radii, the thicknesses, the distances between the lenses, and of course the location of the diaphragm. The refractive index of the several lenses are listed under the heading $n$, the Nu-values under the heading $\gamma$ and the refractive values of the surfaces of the lenses as a fractional part, indicated in decimals, of the total refractive power of the objective is indicated in the last column under the heading $\varphi$. The telephoto effect of this objective is 8.9.

|  |  | $n$ | $\gamma$ | $\phi$ |
|---|---|---|---|---|
| $R_1 = +36.905$ |  |  |  | $+1.49660\Phi$ |
|  | $d_1 = 2.741$ | 1.55232 | 63.49 |  |
| $R_2 = -709.55$ |  |  |  | $+0.07784\Phi$ |
|  | $a_1 = 0.029$ |  |  |  |
| $R_3 = +67.562$ |  |  |  | $+0.87198\Phi$ |
|  | $d_2 = 2.520$ | 1.58913 | 61.24 |  |
| $R_4 = +637.406$ |  |  |  | $-0.09243\Phi$ |
|  | cemented |  |  |  |
| $R_5 = +637.406$ |  |  |  | $+0.12311\Phi$ |
|  | $d_3 = 2.328$ | 1.78472 | 25.71 |  |
| $R_6 = +87.283$ |  |  |  | $-0.89905\Phi$ |
|  | $a_2 = 6.244$ |  |  |  |
| $R_7 = -61.117$ |  |  |  | $-1.09102\Phi$ |
|  | $d_4 = -1.091$ | 1.66680 | 33.09 |  |
| $R_8 = -100.298$ |  |  |  | $+0.66482\Phi$ |
|  | $b_1 = 34.9$ |  |  |  |
|  | $a_3 = 44.256$ |  |  |  |
|  | $b_2 = 9.36$ |  |  |  |
| $R_9 = +22.287$ |  |  |  | $+3.41823\Phi$ |
|  | $d_5 = 1.164$ | 1.76182 | 26.52 |  |
| $R_{10} = +40.243$ |  |  |  | $-1.89305\Phi$ |
|  | $a_4 = 5.269$ |  |  |  |
| $R_{11} = -16.501$ |  |  |  | $-3.75983\Phi$ |
|  | $d_6 = 1.309$ | 1.62041 | 60.29 |  |
| $R_{12} = +34.769$ |  |  |  | $-1.78438\Phi$ |

EXAMPLE 2

The following example is for a telephoto objective of the invention as illustrated in FIG. 3 and also having a focal length of 100.0, a relative aperture of 1:5.6, and a back focal length $s'\infty$ of 10.837. The various values correspond to those provided for Example 1 and to the various symbols included in FIG. 3. The telephoto effect of this lens is 9.2.

|  |  | n | γ | φ |
|---|---|---|---|---|
| $R_1=+31.487$ | $d_1=2.941$ | 1.55232 | 63.49 | $+1.75412\Phi$ |
| $R_2=+200.087$ | $a_1=0.084$ |  |  | $-0.27604\Phi$ |
| $R_3=+39.597$ | $d_2=2.101$ | 1.58313 | 59.32 | $+1.47266\Phi$ |
| $R_4=+198.772$ | cemented |  |  | $-0.29337\Phi$ |
| $R_5=+198.772$ | $d_3=1.821$ | 1.76182 | 26.52 | $+0.38326\Phi$ |
| $R_6=+59.292$ | $a_2=5.463$ |  |  | $-1.28486\Phi$ |
| $R_7=-124.218$ | $d_4=3.362$ | 1.68893 | 31.15 | $-0.55461\Phi$ |
| $R_8=-774.719$ | $b_1=33.617$ $a_3=36.418$ $b_2=2.801$ |  |  | $+0.08892\Phi$ |
| $R_9=-27.514$ | $d_{5a}=0.560$ | 1.85026 | 32.24 | $-3.09028\Phi$ |
| $R_9'=-49.400$ | $a_{a,b}=0.014$ |  |  | $-1.72117\Phi$ |
| $R_{10}=+20.924$ | $d_{5b}=3.922$ | 1.76182 | 26.52 | $+3.64089\Phi$ |
| $R_{11}'=+67.105$ | $a_4=3.082$ |  |  | $-1.13527\Phi$ |
| $R_{11}=-16.816$ | $d_6=2.857$ | 1.60729 | 59.48 | $-3.61138\Phi$ |
| $R_{12}=+22.054$ |  |  |  | $-2.75365\Phi$ |

EXAMPLE 3

An additional example of a telephoto objective as illustrated in FIG. 3 includes the various values set forth below for a focal length of 100.0, a relative aperture of 1:5.6, a back focal length $S'\infty$ of 11.252, and a telephoto effect of approximately 8.9.

|  |  | n | γ | φ |
|---|---|---|---|---|
| $R_1=+32.510$ | $d_1=2.914$ | 1.55232 | 63.49 | $+1.69892\Phi$ |
| $R_2=+189.351$ | $a_1=0.029$ |  |  | $-0.29169\Phi$ |
| $R_3=+40.909$ | $d_2=2.331$ | 1.58913 | 61.24 | $+1.44010\Phi$ |
| $R_4=+226.488$ | cemented |  |  | $-0.26012\Phi$ |
| $R_5=+226.488$ | $d_3=1.676$ | 1.75520 | 27.53 | $+0.33344\Phi$ |
| $R_6=+61.026$ | $a_2=6.120$ |  |  | $-1.23751\Phi$ |
| $R_7=-126.191$ | $d_4=3.351$ | 1.68852 | 30.61 | $-0.54562\Phi$ |
| $R_8=-775.420$ | $b_1=34.972$ $a_3=38.469$ $b_2=3.497$ |  |  | $+0.08879\Phi$ |
| $R_9=-20.392$ | $d_{5a}=0.350$ | 1.85026 | 32.24 | $-4.16958\Phi$ |
| $R_9'=-37.435$ | $a_{a,b}=0.021$ |  |  | $+2.27130\Phi$ |
| $R_{10}=+19.101$ | $d_{5b}=3.934$ | 1.76180 | 26.98 | $+3.98827\Phi$ |
| $R_{10}'=+70.460$ | $a_4=2.914$ |  |  | $-1.08118\Phi$ |
| $R_{11}=-19.949$ | $d_6=2.681$ | 1.60311 | 60.68 | $-3.02326\Phi$ |
| $R_{12}=+25.652$ |  |  |  | $-2.35112\Phi$ |

Several primary and secondary relationships which form primary and secondary requirements of the invention have been set forth above, these being the primary requirements (a)–(e) and the secondary requirements (f)–(o), and for numerical values of the above examples as applied to these various required relationships of the present invention, the following list is provided.

|  | Example | | |
|---|---|---|---|
|  | 1 | 2 | 3 |
| Telephoto-Effect $T = \frac{F}{s'}$ | 8.9101 | 9.2276 | 8.8873 |
| (a) $1.0\Phi < \varphi V < 1.4\Phi$ | $+1.15185\Phi$ | $+1.29008\Phi$ | $+1.22631\Phi$ |
| (b) $3.67\Phi < |\varphi H| < 5.33\Phi$ | $-3.91903\Phi$ | $-5.22852\Phi$ | $-4.36557\Phi$ |
| (c) $0.47 F > A > 0.33F$ | 0.44256F | 0.36418F | 0.38469 |
| (d) $3.33 < (A:s'\infty) < 4.33$ | 3.9392266 | 3.360507 | 3.418855 |
| (e) $0.052 < (A.s'\infty) > 0.037$ | 0.49720 | 0.039466 | 0.043285 |
| (f) $0.04 F < a_2 < 0.07F$ | 0.06244F | 0.05463F | 0.06120F |
| (g) $5/3\Phi < |\varphi a_2| < 7/3\Phi$ | $-1.99007\Phi$ | $-1.83947\Phi$ | $-1.78313\Phi$ |
| (h) $0.4\Phi < |\varphi L_{,v}| < 0.5\Phi$ | $-0.42620\Phi$ | $-0.46569\Phi$ | $-0.45683\Phi$ |
| (i) $1.25 < \sigma L_{IV} < 4.25$ | 4.1197 | 1.38926 | 1.3887 |
| (j) $0.9\Phi < \varphi L_V < 1.6\Phi$ | $+1.52518\Phi$ | $+1.13651\Phi$ | $+1.00881\Phi$ |
| (k) $5\Phi < |\varphi L_{VI}| < 6.5\Phi$ | $-5.54421\Phi$ | $-7.36503\Phi$ | $-5.37438\Phi$ |
| (l) $-5.75\Phi > \varphi a_4 > -3.75\Phi$ | $-5.65288\Phi$ | $-4.74665\Phi$ | $-4.10444\Phi$ |
| (m) $0.027 F < a_4 < 0.055F$ | 5.269% F | 3.082 %F | 2.914% F |
| (n) $5\Phi < \varphi a_{a,b} < 6.5\Phi$ | -------- | $+5.36206$ | $+6.25957$ |

The values for the refractive indices of the glasses listed in the numerical tables under the heading $n$ and quoted in the claims all refer to the yellow d–line of the Helium spectrum.

What is claimed is:

1. A photographic telephoto objective having a telephoto effect of between 7 and 14 and including a front positive component and a rear negative component separated from said front component by a predetermined air space, and having an exit pupil closely adjacent to said rear component and a diaphragm between said components and situated adjacent said rear negative component, said front and rear components fulfilling, in combination, the following requirements:

(a) said front component including at least three elements separated from each other by air spaces and having surfaces providing a total refractive power which is greater than 100% but not more than 140% of the equivalent refractive power of the objective;

(b) said rear component is made up of elements having surfaces providing a total negative refractive power which has an absolute value of between 3.67 and 5.33 times the equivalent refractive power of the entire objective;

(c) said predetermined space between said front and rear components has a size along the optical axis from the rearmost vertex of the front component to the forwardmost vertex of the rear component which is smaller than 0.47 times the focal length of the entire objective but greater than 0.33 times the latter focal length;

(d) the quotient resulting from dividing of said size of said air space along said principal axis by the back focal length is between 3.33 and 4.33;

(e) the product obtained by multiplying said size of said predetermined air space along said principal axis divided by the focal length of the entire objective and the back focal length divided by the square of the focal length of the entire objective is between 0.052 and 0.037;

(f) said front component including a front converging lens and a rear diverging lens and between said front and rear lenses, an inner lens means separated from said front and rear lenses by predetermined air spaces, said air space between said inner lens means and said rear lens of said front component having the shape of a positive lens with a diverging action and said latter air space having along the principal axis between said inner lens means and said rear lens of said component a distance of between 0.04 and 0.07 of the focal length of the entire objective;

(g) said latter air space forming an air lens which itself has a diverging refractive power whose absolute value is greater than 5/3 but does not exceed 7/3 times the refractive power of the entire objective;

(h) said front component having a rear negative lens whose refractive power is between 0.4 and 0.5 times the refractive power of the entire objective; and (i) said rear negative lens of said front component having a Gardner shape factor of between +1.25 and +4.25, said rear component including a front positive element whose refractive power is between 0.9 and 1.6 times the total refractive power of the entire objective and a rear negative element whose absolute negative refractive power is between 5 and 6.5 times the refractive power of the entire objective, and said front and rear elements of said rear component being separated from each other by an air space having the configuration of a converging lens and limited by a pair of surfaces whose total effective power has a negative value which is between 3.75 and 5.75 times the value of the refractive power of the entire objective, said air space between said front and rear elements of said rear component having along the principal axis between the rear vertex of said front element and the front vertex of said rear element of said rear component a size of between 0.027 and 0.055 times the equivalent focal length of the entire objective.

2. A telephoto objective as recited in claim 1 and wherein said front positive element of said rear component consists of two single lenses, said lenses being a front diverging meniscus lens which has a forwardly directed concave surface and a converging lens which defines with said meniscus lens an air space having the configuration of a biconcave negative lens whose converging refractive power is between 5.0 and 6.5 times the refractive power of the entire objective.

3. A telephoto objective as recited in claim 1 and wherein there is the following specific example for the telephoto objective shown in FIG. 2 where the focal length is 100, the relative aperture is 1:5.6, the back focal length $s'/_a$ is 11.235, with all of the symbols corresponding to those of FIG. 2, with respect to radii, thicknesses, distance between the lens, and location of the diaphragm, the refractive index of the several lenses being listed under the column headed $n$, the Nu-values being listed under the heading $\gamma$, and the refractive values of the surfaces of the lenses as a fractional part, indicated in decimals, of the total refractive power of the objective being indicated in the last column, the telephoto effect of the objective being 8.9:

|  |  | $n$ | $\gamma$ | $\varphi$ |
|---|---|---|---|---|
| $R_1=+36.905$ | $d_1=2.741$ | 1.55232 | 63.49 | $+1.49660\Phi$ |
| $R_2=-709.55$ | | | | $+0.07784\Phi$ |
| $R_3=+67.562$ | $a_1=0.029$ | | | $+0.87198\Phi$ |
| $R_4=+637.406$ | $d_2=2.520$ | 1.58913 | 61.24 | $-0.09243\Phi$ |
| $R_5=+637.406$ | cemented | | | $+0.12311\Phi$ |
| $R_6=+87.283$ | $d_3=2.328$ | 1.78472 | 25.71 | $-0.89905\Phi$ |
| $R_7=-61.117$ | $a_2=6.244$ | | | $-1.09102\Phi$ |
| $R_8=-100.298$ | $d_4=-1.091$ | 1.66680 | 33.09 | $+0.66482\Phi$ |
| | $b_1=34.9$ | | | |
| | $a_3=44.256$ | | | |
| | $b_2=9.36$ | | | |
| $R_9=+22.287$ | $d_5=1.164$ | 1.76182 | 26.52 | $+3.41823\Phi$ |
| $R_{10}=+40.243$ | | | | $-1.89305\Phi$ |
| $R_{11}=-16.501$ | $a_4=5.269$ | | | $-3.75983\Phi$ |
| $R_{12}=+34.769$ | $d_6=1.309$ | 1.62041 | 60.29 | $-1.78438\Phi$ |

4. A telephoto objective as recited in claim 1 and wherein the objective has the following specific details, with the objective having a focal length of 100.0, a relative aperture of 1:5.6, and a back focal length $s'3_x$ of 10.737, the various values corresponding to those of Example 1, the various symbols corresponding to those of FIG. 3, and the telephoto effect being 9.2:

|  |  | $n$ | $\gamma$ | $\varphi$ |
|---|---|---|---|---|
| $R_1=+31.487$ | $d_1=2.941$ | 1.55232 | 63.49 | $+1.75412\Phi$ |
| $R_2=+200.087$ | | | | $-0.27604\Phi$ |
| | $a_1=0.084$ | | | |
| $R_3=+39.597$ | $d_2=2.101$ | 1.58313 | 59.32 | $+1.47266\Phi$ |
| $R_4=+198.772$ | cemented | | | $-0.29337\Phi$ |
| $R_5=+198.772$ | $d_3=1.821$ | 1.76182 | 26.52 | $+0.38326\Phi$ |
| $R_6=+59.292$ | | | | $-1.28486\Phi$ |
| | $a_2=5.463$ | | | |
| $R_7=-124.218$ | $d_4=3.362$ | 1.68893 | 31.15 | $-0.55461\Phi$ |
| $R_8=-774.719$ | | | | $+0.08892\Phi$ |
| | $b_1=33.617$ | | | |
| | $a_3=36.418$ | | | |
| | $b_2=2.801$ | | | |
| $R_9=-27.514$ | $d_{5a}=0.560$ | 1.85026 | 32.24 | $-3.09028\Phi$ |
| $R_9'=-49.400$ | | | | $-1.72117\Phi$ |
| | $a_{a,b}=0.014$ | | | |
| $R_{10}=+20.924$ | $d_{5b}=3.922$ | 1.76182 | 26.52 | $+3.64089\Phi$ |
| $R_{10}'=+67.105$ | | | | $-1.13527\Phi$ |
| | $a_4=3.082$ | | | |
| $R_{11}==-16.816$ | $d_6=2.857$ | 1.60729 | 59.48 | $-3.61138\Phi$ |
| $R_{12}=+22.054$ | | | | $-2.75365\Phi$ |

5. A telephoto objective as recited in claim 1 and wherein the objective has the specific details set forth below for an objective having the symbols corresponding to those of FIG. 3 with the various values as indicated in Example 1 and the focal length being 100.0, the relative aperture being 1:5.6, the back focal length $s'_x$ being 11.252 and the telephoto effect being 8.9:

|  |  | $n$ | $\gamma$ | $\varphi$ |
|---|---|---|---|---|
| $R_1=+32.510$ | $d_1=2.914$ | 1.55232 | 63.49 | $+1.698\ 2\Phi$ |
| $R_2=+189.351$ | | | | $-0.29169\Phi$ |
| | $a_1=0.029$ | | | |
| $R_3=+40.909$ | $d_2=2.331$ | 1.58913 | 61.24 | $+1.44010\Phi$ |
| $R_4=+226.488$ | cemented | | | $-0.26012\Phi$ |
| $R_5=+226.488$ | $d_3=1.676$ | 1.75520 | 27.53 | $+0.33344\Phi$ |
| $R_6=+61.026$ | | | | $-1.23751\Phi$ |
| | $a_2=6.120$ | | | |
| $R_7=-126.191$ | $d_4=3.351$ | 1.68852 | 30.61 | $-0.54562\Phi$ |
| $R_8=-775.420$ | | | | $+0.08879\Phi$ |
| | $b_1=34.972$ | | | |
| | $a_3=38.469$ | | | |
| | $b_2=3.497$ | | | |
| $R_9=-20.392$ | $d_{5a}=0.350$ | 1.85026 | 32.24 | $-4.16958\Phi$ |
| $R_9'=-37.435$ | | | | $+2.27130\Phi$ |
| | $a_{a,b}=0.021$ | | | |
| $R_{10}=+19.101$ | $d_{5b}=3.934$ | 1.76180 | 26.98 | $+3.98827\Phi$ |
| $R_{10}'=+70.460$ | | | | $-1.08118\Phi$ |
| | $a_4=2.914$ | | | |
| $R_{11}==-19.949$ | $d_6=2.681$ | 1.60311 | 60.68 | $-3.02326\Phi$ |
| $R_{12}=+25.652$ | | | | $-2.35112\Phi$ |

References Cited

UNITED STATES PATENTS 3,106,598 10/1963 Buzawa.
3,388,956 6/1968 Eggert et al.

FOREIGN PATENTS 1,218,166 12/1959 France.

DAVID SCHONBERG, Primary Examiner

P. A. SACHER, Assistant Examiner

U.S. Cl. X.R.

350—210, 214, 215, 216, 218